(12) United States Patent
Rezvani

(10) Patent No.: US 6,462,560 B1
(45) Date of Patent: Oct. 8, 2002

(54) SENSOR ANALYZER WITH REDUCED LOW FREQUENCY NOISE

(75) Inventor: Behzad Rezvani, Anaheim, CA (US)

(73) Assignee: Rosemount Analytical Inc., Irvine, CA (US)

( * ) Notice: Subject to any disclaimer, the term of this patent is extended or adjusted under 35 U.S.C. 154(b) by 14 days.

(21) Appl. No.: 09/748,884

(22) Filed: Dec. 27, 2000

(51) Int. Cl.[7] .............................................. G01R 27/92
(52) U.S. Cl. ...................................... 324/611; 324/613
(58) Field of Search ................................ 324/611, 609, 324/602, 605, 613, 76.47

(56) References Cited

U.S. PATENT DOCUMENTS

| | | | |
|---|---|---|---|
| 5,095,264 A | * 3/1992 | Hulsing | 324/76.47 |
| 5,467,090 A | 11/1995 | Baumgartner et al. | 341/155 |
| 5,729,145 A | 3/1998 | Blades | 324/536 |

* cited by examiner

Primary Examiner—Christine K. Oda
(74) Attorney, Agent, or Firm—Westman, Champlin & Kelly, P.A.

(57) ABSTRACT

A circuit includes an integrator arranged to integrate input signals over a predetermined sample period based on the cycle period of a power source signal. A delay is coupled to the integrator and is responsive to the end of a sample period to delay start of a successive sample period for a predetermined time delay to cancel low frequency noise induced into the circuit during a prior sample period.

14 Claims, 1 Drawing Sheet

SENSOR ANALYZER WITH REDUCED LOW FREQUENCY NOISE

FIELD OF THE INVENTION

This invention relates to electrical noise reduction in electronic analyzers, and particularly to an apparatus and method of reducing low frequency noise in analyzers that employ integrators that integrate sensor signals in industrial process monitoring systems.

BACKGROUND OF THE INVENTION

There exists a class of analyzer for industrial process sensors that samples the sensor signals and integrates the sensor signals over a sample period. Commercial line power often affects these analyzers by inducing a voltage into the sensor signals. Because the induced signal is positive for one-half line frequency cycle and negative for one-half line frequency cycle, the effects of the induced line frequency cancels over the full line power cycle. Consequently, it is common to extend the sample period to equal some multiple of the line power cycle period. For example, a sample period of 100 milliseconds is a common standard because it is a multiple of the line power cycle periods for both 50 Hertz and 60 Hertz power. However, if the power frequency varies, noise is induced at a low "beat" frequency. For example, if the sample period is 100 milliseconds (equal to 6 cycles of line power at 60 Hertz) and the actual line power is at 60.1 Hertz, a low frequency noise is induced into the analyzer at 0.1 Hertz. It is not practical to filter out low frequencies such as 0.1 Hertz. Consequently, where the analyzer operates on the line power, it has been common to monitor the line power frequency and synchronize the sample period to a multiple of the line power period. However, it is not possible or feasible to monitor line power in some devices. For example, where the analyzer is battery operated or operated by some other power source, such as an industrial process control two-wire communication link that supplies power to the analyzer from a central station, there is no effective way to monitor line power. Consequently, it is not possible to minimize low frequency noise due to induction of signals into the analyzer at line power frequency.

SUMMARY OF THE INVENTION

The present invention is directed to a technique of minimizing generation of low frequency noise induced by line power, thereby minimizing the adverse effects of the noise without monitoring line power.

A circuit according to the present invention includes an integrator arranged to integrate input signals over a predetermined sample period. The sample period is based on the period of a cycle of a power source at a base frequency, such as 50 or 60 Hertz, or both. A delay is coupled to the integrator and is responsive to the end of a sample period to delay start of a successive sample period for a predetermined time delay.

Noise induced into the circuit due to line power at the base frequency (e.g., 60 Hertz) cancels due to the equal amount of positive and negative portions of the noise over the entire sample period. Noise induced into the circuit due to line power that is not canceled over the entire sample period is cancelled during subsequent sample periods by induced noise that is out-of-phase with the previously induced noise.

The invention is particularly useful in environments where the circuit is not directly coupled to the line power source, such as in battery operated analyzers in industrial process control systems, and therefor cannot monitor the line power to synchronize the sample periods.

One aspect of the invention is a process of operating a circuit to minimize noise induced into the output signal of the circuit.

DETAILED DESCRIPTION

Figure 1:
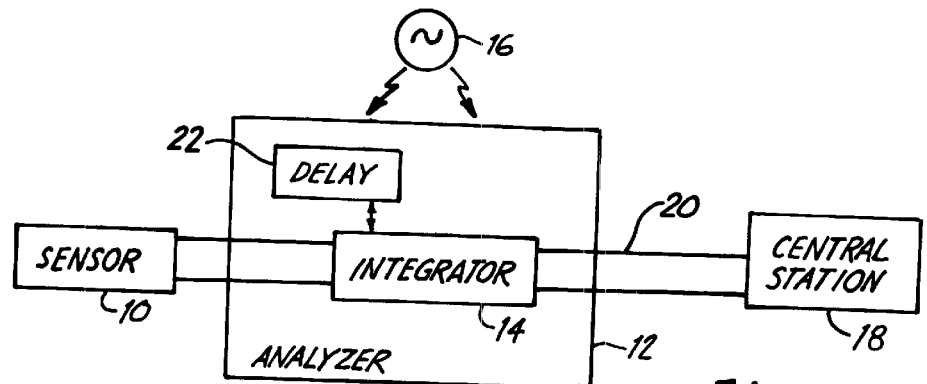
FIG. 1 is a block diagram of apparatus for sensing a process variable in accordance with the presently preferred embodiment of the present invention.

FIG. 1 illustrates an industrial process sensor 10 that senses a variable of an industrial process such as pressure, temperature, pH, conductivity, etc. Sensor 10 is coupled to analyzer 12 which includes integrator 14. A source 16 is an AC power source having a standard 60 or 50 Hertz frequency typically available from a power company or other commercial power supplier. Source 16 is not coupled to the analyzer, but instead is present in the vicinity of analyzer as to induce signals at the line frequency into the analyzer circuits. Integrator 14 samples signals from sensor 10 over some finite sample period and integrates the sensor signals to supply an output signal to a utilization circuit, such as to central control station 18 via two-wire communication link 20. The sample period is independent of power frequency, and is typically between about 16 milliseconds and 1 second, although longer and shorter sample periods may be employed. Also typically, the sample period is established as equal to an integer multiple of the period of the line power to cancel the effects of induced line power signals into the analyzer. Thus, a sample period of 100 milliseconds extends over 6 cycles of line power (at 60 Hertz) and is six times as long as a line power period. It also extends over 5 cycles of line power at 50 Hertz, rendering the 100 millisecond sample period useful for both power standards. Of course, sample periods of a single power cycle may be employed, in which case the sample period would be 16.67 milliseconds for 60 Hertz power and 20 milliseconds for 50 Hertz power.

The output of integrator 14 and analyzer 12 is provided to utilization circuit 18 for subsequent use in the industrial process control system. For example, utilization circuit 18 may comprise a central control station coupled by two-wire communication link 20 to analyzer 12 to receive and process signals representative of the variable sensed by sensor 10. In such cases, the power from central control station 18 might be supplied to analyzer 12 by two-wire communication link 20. In other cases, output device 18 may be an indicator coupled to the analyzer, and the analyzer may be powered by a DC power from a portable power source, such as a battery. In either case, the proximate line voltage 16 induces signals into the output of analyzer 12 at the frequency of the line power (e.g., 50 or 60 Hertz).

The sample period is set to a predetermined period to exactly equal a multiple of the power cycle. Consequently, positive and negative components of the induced signals cancel over the full sample period. However, where the sample period is not exactly equal to a multiple of the line power cycle period, such as where the line power frequency varies or the sample period changes, the positive and negative components of the noise signal induced into the analyzer do not fully cancel. Moreover, if the next sample period starts at the same point on the power cycle that the previous sample period ended, the induced noise accumulates over several sample periods. Thus, a signal is induced into the analyzer circuit having a frequency representative of the difference between the actual line frequency and the expected line frequency. For example, if the sample period operates for a line frequency of 60.0 Hertz but the line frequency is actually 60.1 Hertz, a noise signal is induced into the analyzer output at a frequency of 0.1 Hertz (10 seconds per cycle). The present invention employs a delay circuit 22 that delays the start of integrator 14 for a period of time following the end of a prior sample period.

Delay circuit 22 is responsive to the end of a sample period of integrator 14 and delays the start of the next (successive) sample period for some time period established by delay circuit 22. I have found that generation of low frequency noise is minimized by delaying the start of successive sample periods. More particularly, delaying the start of a successive sample period by some fraction of the cycle of the line power, noise accumulated during one sample period tends to be cancelled by noise induced during the successive sample period. Consequently, low frequency noise is best minimized by delaying the start of the sample period by one-half of a line power cycle so that noise of one polarity accumulated during one sample period is cancelled by noise of opposite polarity induced during the next sample period. Noise induced into the analyzer circuit, such as by a varying line frequency induced into the analyzer, is effectively cancelled by the half-cycle delay. While best results are achieved with a half-cycle delay. I have also found that low voltage noise is reduced with any delay between the consecutive cycles, as long as the delay is not evenly divisible by the line cycle period. Consequently, it is important to the present invention that the time delay be a non-integer multiple of the line power period so successive sample periods commence at different times on the power cycle period. In the preferred form of the invention, delay circuit 22 delays start of the sample period by 25 milliseconds. The 25 milliseconds is particularly advantageous since it represents 1.25 cycles of a 50 Hertz power frequency and approximately 1.5 cycles of a 60 Hertz power frequency, and thus is suitable for both 50 and 60 Hertz power standards.

Figure 2:
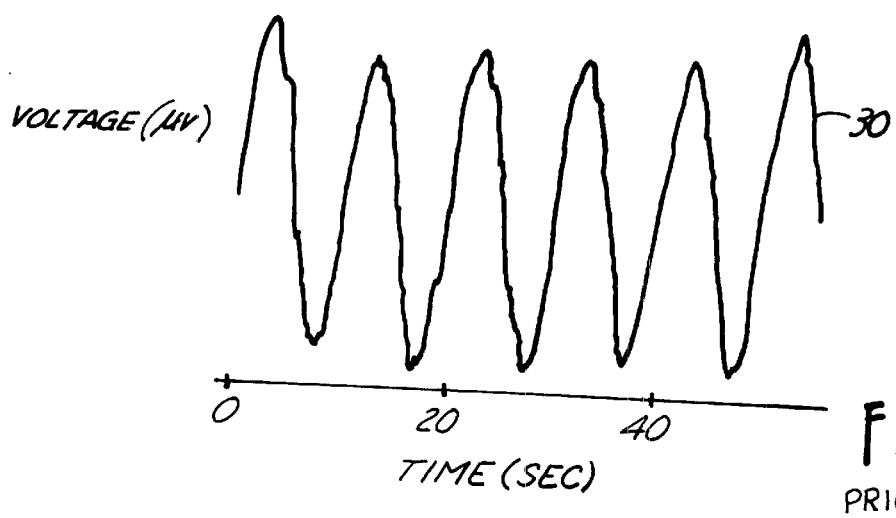
FIG. 2 illustrates an output of an analyzer that does not employ the techniques of the present invention.
Figure 3:
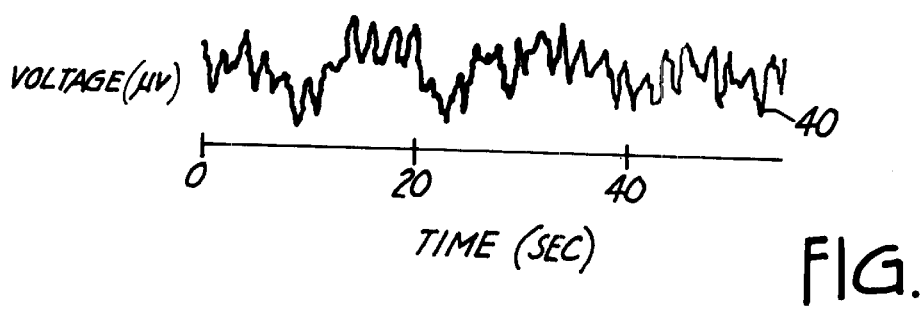
FIG. 3 is a waveform of the output of the analyzer illustrated in FIG. 1 employing the techniques of the present invention.

FIG. 2 illustrates a waveform 30 of the voltage output of an analyzer having an induced signal generated by power having a frequency of 60.1 Hertz, where the sample period is 100 milliseconds and no delay is introduced between successive sample periods. As shown in FIG. 2, without a delay between sample periods, a significant low frequency noise component is generated in the output signal from the analyzer, the noise having a frequency of about 0.1 Hertz. More particularly, with the sample period (100 milliseconds) "tuned" to a line frequency of 50 or 60 Hertz, the 0.1 Hertz error in the line frequency generates a low frequency noise. This error accumulates over several sample periods, resulting in low frequency noise in the output signal. The present invention effectively prevents the accumulation of low frequency noise by starting successive sample periods at different point on the power cycle, so that the low frequency signal tends to cancel in the analyzer circuit. FIG. 3 illustrates a waveform 40 of the output voltage of analyzer 12, also operated with a power that varies between 60 and 60.1 Hertz and a 100 millisecond sample period. As shown in FIG. 3, the addition of a 25 millisecond delay between successive sample periods significantly reduces low frequency noise in the output signal. Similar results occur with different sample periods, such as 800 millisecond sample periods.

The present invention thus provides an effective technique for reducing low frequency noise in circuits where monitoring of the power line source is not possible. While the invention has been described in analyzers for industrial process control sensors, the invention is equally applicable to other types of circuits where induction of low frequency noise due to local line power may be a problem. The apparatus and technique is inexpensive to implement and is effective in operation. The additional delay between sample periods does not adversely affect operation of the monitoring system.

Although the present invention has been described with reference to preferred embodiments, workers skilled in the art will recognize that changes may be made in form and detail without departing from the spirit and scope of the invention.

What is claimed is:

1. A process of operating a circuit to minimize induction of low frequency signals from a commercial power source into the circuit due to a difference of frequency of the power source from a base frequency, the process comprising steps of:

a) defining successive sample periods each having a predetermined time duration based on a cycle period of the power source at the base frequency;

b) integrating signals from a sensor during the sample periods; and c) delaying the start of successive sample periods.

2. The process of claim 1 wherein the base frequency is selected from the group consisting of 50 and 60 Hertz, and the delay is about 25 milliseconds.

3. The process of claim 1, wherein the power source induces a signal into an output signal of the circuit, and wherein step a) comprises:

defining each sample period as an integer multiple of the cycle period so that the signal induced into the output signal is effectively cancelled;

and wherein step c) comprises:

delaying the start of successive sample periods by a non-integer multiple of the cycle period.

4. The process of claim 2, wherein the power source induces a signal into an output signal of the circuit and wherein step a) comprises:

defining each sample period as an integer multiple of the cycle period so that the signal induced into the output signal is effectively cancelled;

and wherein step c) comprises:

delaying the start of successive sample periods by a non-integer multiple of the cycle period.

5. A circuit for providing an output signal comprising, in combination:

an integrator arranged to integrate input signals over successive predetermined sample periods based on a cycle period of a power source at a base frequency; and a delay coupled to the integrator and responsive to the end of a first sample period to delay start of a second sample period.

6. The circuit of claim 5, characterized in that the circuit is not coupled the power source.

7. The circuit of claim 6, wherein the power source induces a signal into the output signal, the sample period of the integrator being an integer multiple of the cycle period so that the signal induced into the output signal is effectively cancelled, the delay being a non-integer multiple of the cycle period.

8. The circuit of claim 5, wherein the power source induces a signal into the output signal, the sample period of the integrator being an integer multiple of the cycle period so that the signal induced into the output signal is effectively cancelled, the delay being a non-integer multiple of the cycle period.

9. An industrial process monitor system comprising, in combination:
- a sensor arranged to sense an industrial process variable and provide a signal based on the sensed variable;
- an analyzer coupled to the sensor for receiving the signal from the sensor and providing an output signal, the analyzer including
    - an integrator arranged to be coupled to the sensor to integrate signals from the sensor over a predetermined sample period based on a cycle period of a power source at a base frequency; and
    - a delay coupled to the integrator and responsive to the end of a first sample period to delay start of a second sample period.

10. The industrial process monitor system of claim 9, characterized in that the analyzer is not coupled to the power source.

11. The industrial process monitor system of claim 10, wherein the power source induces a signal into the output signal, the sample period of the integrator being an integer multiple of the cycle period so that the signal induced into the output signal of the analyzer is effectively cancelled, the delay being a non-integer multiple of the cycle period.

12. The industrial process monitor system of claim 9, wherein the power source induces a signal into the output signal, the sample period of the integrator being an integer multiple of the cycle period so that the signal induced into the output signal of the analyzer is effectively cancelled, the delay being a non-integer multiple of the cycle period.

13. The industrial process monitor system of claim 9, further including a two-wire communication link coupling the analyzer to a central control station, the analyzer being powered by the central control station via the two-wire communication link.

14. The industrial process monitor system of claim 13, wherein the power source induces a signal into the output signal, the sample period of the integrator being an integer multiple of the cycle period so that the signal induced into the output signal of the analyzer is effectively cancelled, the delay being a non-integer multiple of the cycle period.

* * * * *